US012600149B2

(12) United States Patent
Nakamura

(10) Patent No.: US 12,600,149 B2
(45) Date of Patent: Apr. 14, 2026

(54) INK JET RECORDING APPARATUS INCLUDING PLURALITY OF DIVIDED TRANSPORT PLATES AND PLURALITY OF DIVIDED SUCTION CHAMBERS

(71) Applicant: KYOCERA Document Solutions Inc., Osaka (JP)

(72) Inventor: Satoru Nakamura, Osaka (JP)

(73) Assignee: KYOCERA Document Solutions Inc., Osaka (JP)

(*) Notice: Subject to any disclaimer, the term of this patent is extended or adjusted under 35 U.S.C. 154(b) by 258 days.

(21) Appl. No.: 18/515,629

(22) Filed: Nov. 21, 2023

(65) Prior Publication Data

US 2024/0174006 A1 May 30, 2024

(30) Foreign Application Priority Data

Nov. 29, 2022 (JP) ................................ 2022-190131

(51) Int. Cl.
*B41J 11/00* (2006.01)

(52) U.S. Cl.
CPC .......... *B41J 11/007* (2013.01); *B41J 11/0085* (2013.01)

(58) Field of Classification Search
CPC ............................ B41J 11/007; B41J 11/0085
See application file for complete search history.

(56) References Cited

U.S. PATENT DOCUMENTS

| | | | | |
|---|---|---|---|---|
| 2003/0084811 A1* | 5/2003 | Ishii | B41J 11/06 | 101/494 |
| 2004/0239741 A1* | 12/2004 | Ishii | B41J 11/0085 | 347/101 |
| 2007/0046758 A1* | 3/2007 | Inoue | B41J 13/14 | 347/104 |
| 2019/0030913 A1* | 1/2019 | Inaba | B41J 2/1629 | |
| 2023/0062349 A1* | 3/2023 | Nakamura | B65H 54/702 | |

FOREIGN PATENT DOCUMENTS

| | | | |
|---|---|---|---|
| JP | 6311583 B2 * | 4/2018 | |
| JP | 6719250 B2 | 7/2020 | |

* cited by examiner

*Primary Examiner* — Sharon Polk
(74) *Attorney, Agent, or Firm* — IP Business Solutions, LLC.

(57) ABSTRACT

An ink jet recording apparatus includes a recording head, a transport device, and a suction device. The transport device includes an endless belt that transports a sheet along a first direction, and a transport plate. The suction device adsorbs the sheet to the endless belt. The endless belt includes a plurality of air intake holes, penetrating in a second direction, intersecting the first direction and corresponding to an ink ejecting direction from the recording head toward the sheet. The transport plate includes a plurality of suction holes penetrating in the second direction, and a plurality of divided transport plates aligned in the first direction. The suction device includes a plurality of suction chambers divided along the first direction. A joint between the divided transport plates adjacent to each other, and a joint between the suction chambers adjacent to each other, are positionally shifted from each other in the first direction.

4 Claims, 7 Drawing Sheets

INK JET RECORDING APPARATUS INCLUDING PLURALITY OF DIVIDED TRANSPORT PLATES AND PLURALITY OF DIVIDED SUCTION CHAMBERS

INCORPORATION BY REFERENCE

This application claims priority to Japanese Patent Application No.2022-190131 filed on Nov. 29, 2022, the entire contents of which are incorporated by reference herein.

BACKGROUND

The present disclosure relates to an ink jet recording apparatus.

Ink jet recording apparatuses are generally known, as a type of image forming apparatus. Many of the existing ink jet recording apparatus include a recording head that ejects ink onto a recording medium, such as a sheet, a transport device that transports the recording medium to an image forming position of the recording head, and a suction device that adsorbs the recording medium to the transport device.

The transport device includes an endless belt for carrying thereon the recording medium and transporting the same, and a transport plate (platen plate) slidably supporting the endless belt. The suction device includes a pressure chamber and a suction fan.

SUMMARY

The disclosure proposes further improvement of the foregoing techniques.

In an aspect, the disclosure provides an ink jet recording apparatus including a recording head, a transport device, and a suction device. The recording head ejects ink onto a recording medium. The transport device includes an endless belt that transports the recording medium along a first direction, toward an image forming position of the recording head, and a transport plate slidably supporting the endless belt. The suction device is located on an opposite side of the recording medium across the endless belt, and adsorbs the recording medium to the endless belt. The endless belt includes a plurality of air intake holes, penetrating through the endless belt in a second direction, intersecting the first direction and corresponding to a direction in which the ink is ejected from the recording head toward the recording medium. The transport plate is located between the endless belt and the suction device, and includes a plurality of suction holes penetrating through the transport plate in the second direction, and a plurality of divided transport plates aligned in the first direction. The suction device includes a plurality of suction chambers divided along the first direction. A joint between the divided transport plates adjacent to each other, and a joint between the suction chambers adjacent to each other, are positionally shifted from each other in the first direction.

DETAILED DESCRIPTION

Figure 1:
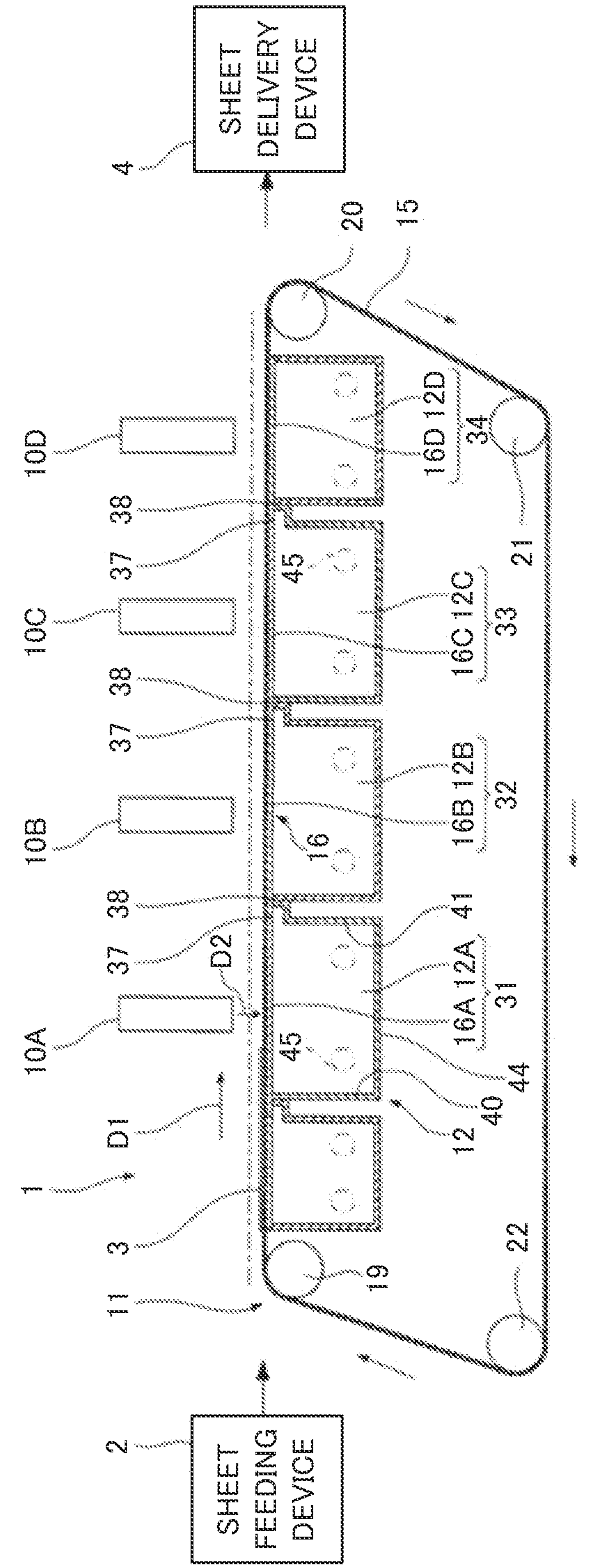
FIG. 1 is a schematic cross-sectional view showing a configuration of an ink jet recording apparatus.

Hereafter, an embodiment of the disclosure will be described, with reference to the drawings. In the drawings, the same or corresponding elements will be given the same numeral, and the description of such elements will not be repeated.

Figure 2:
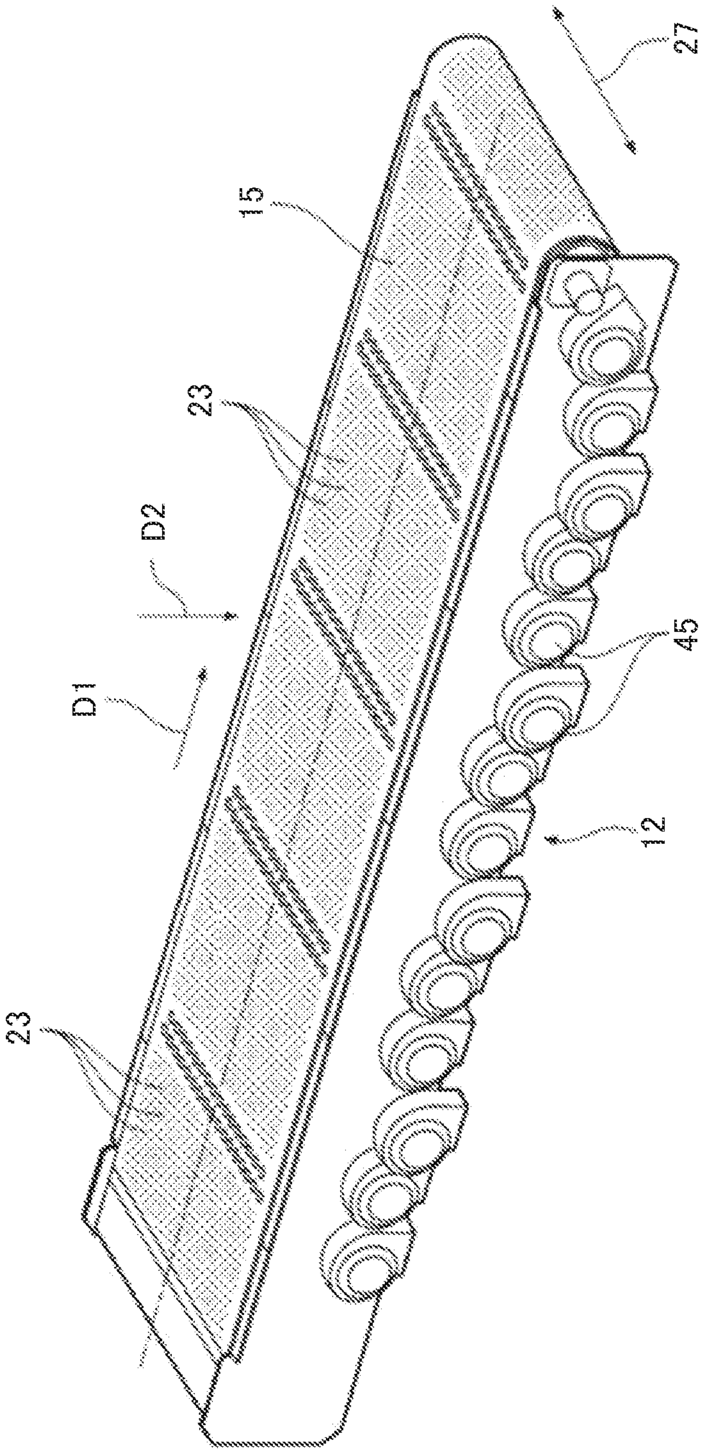
FIG. 2 is a perspective view showing a transport belt.
Figure 3:
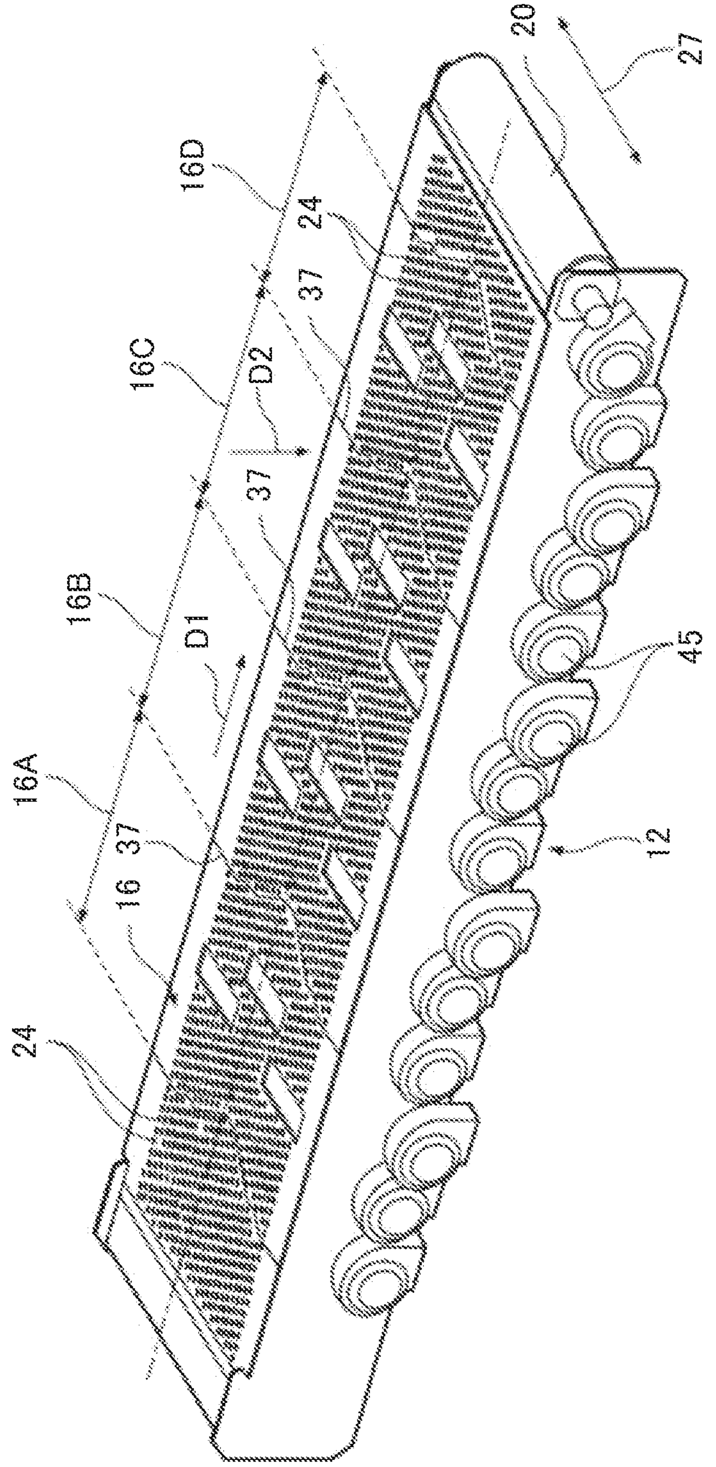
FIG. 3 is a perspective view showing a transport plate.
Figure 4:
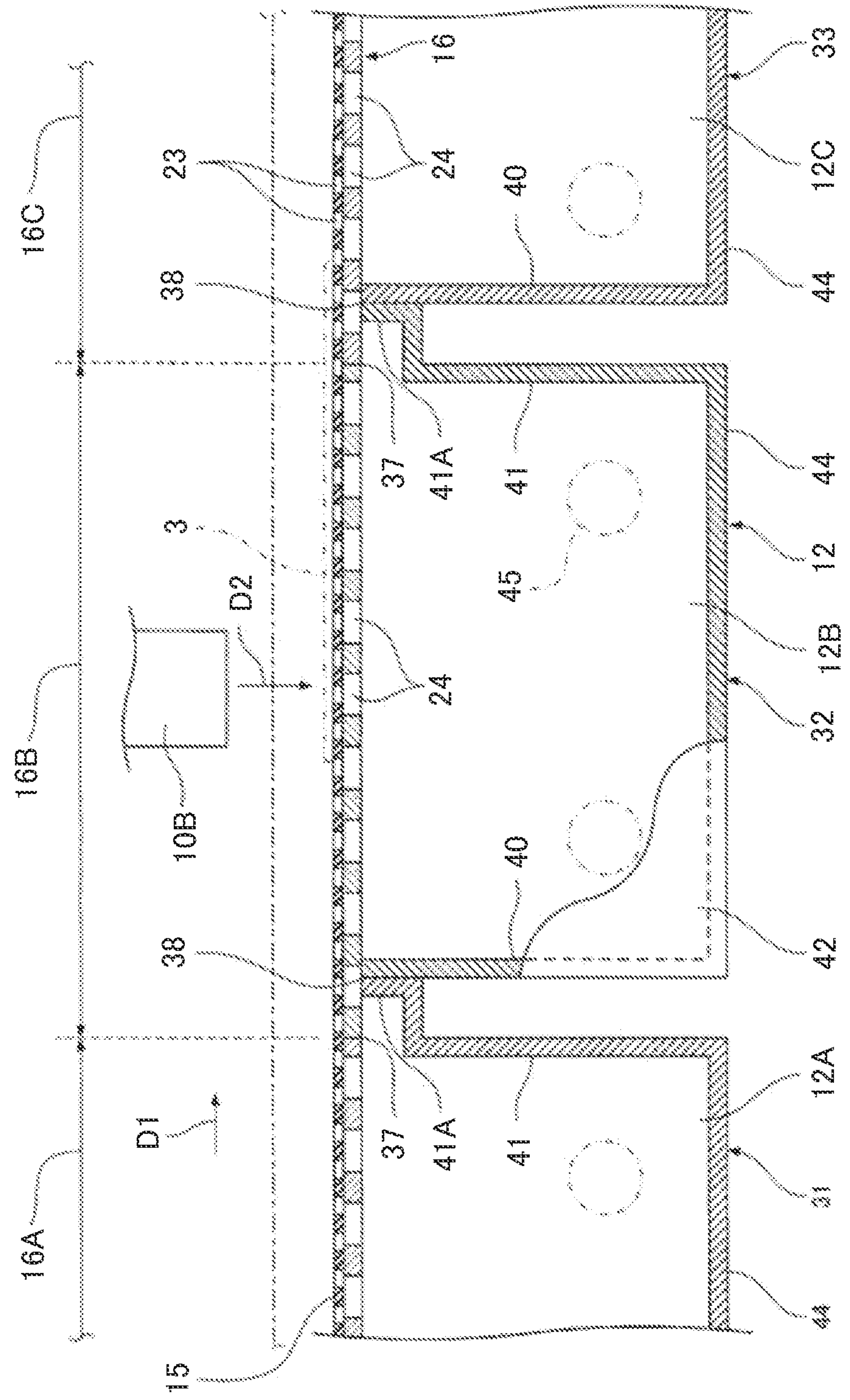
FIG. 4 is a cross-sectional view showing how units of the ink jet recording apparatus are connected.
Figure 5:
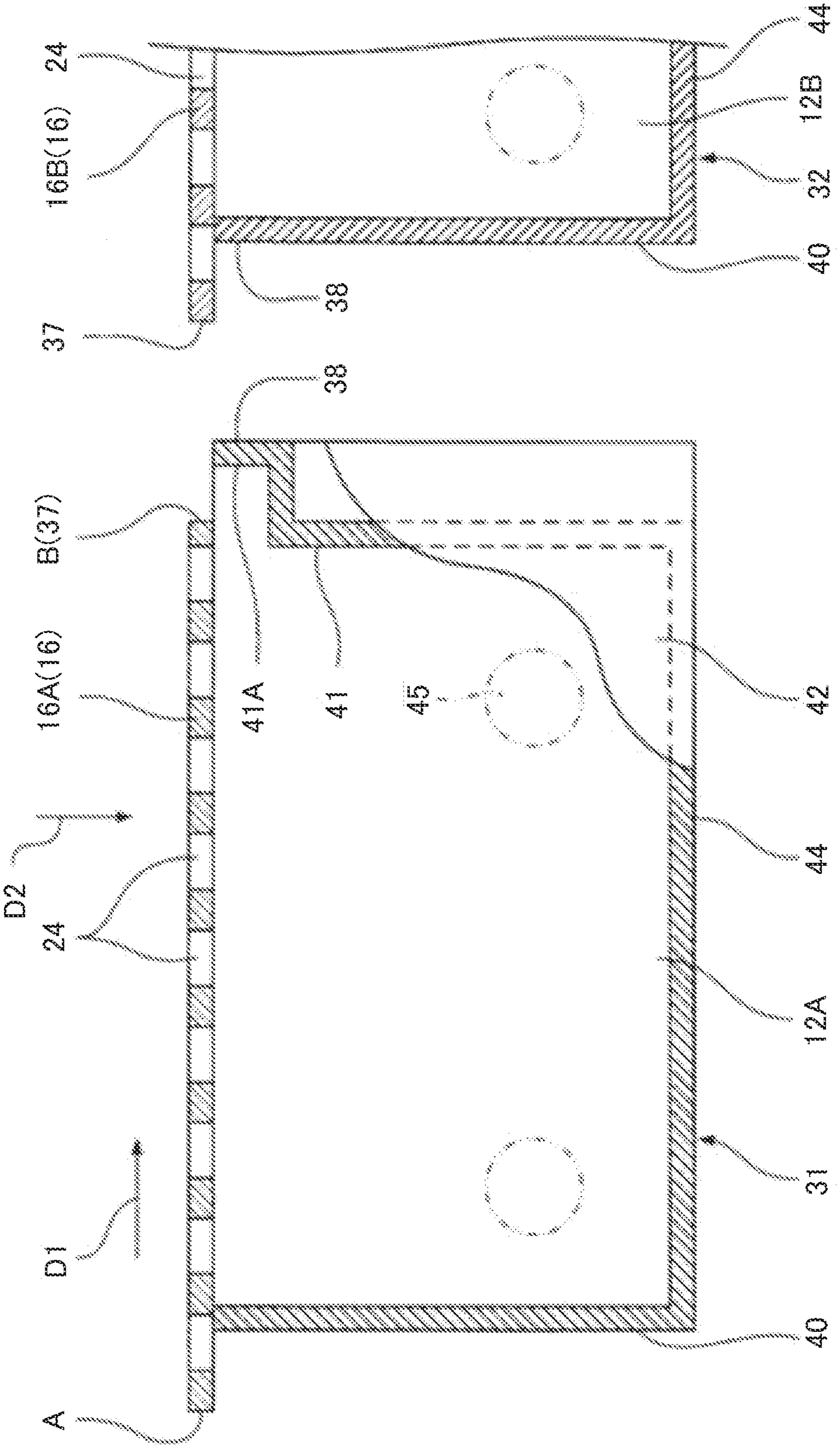
FIG. 5 is a cross-sectional view showing a first unit and a second unit of the ink jet recording apparatus, separated from each other.
Figure 6:
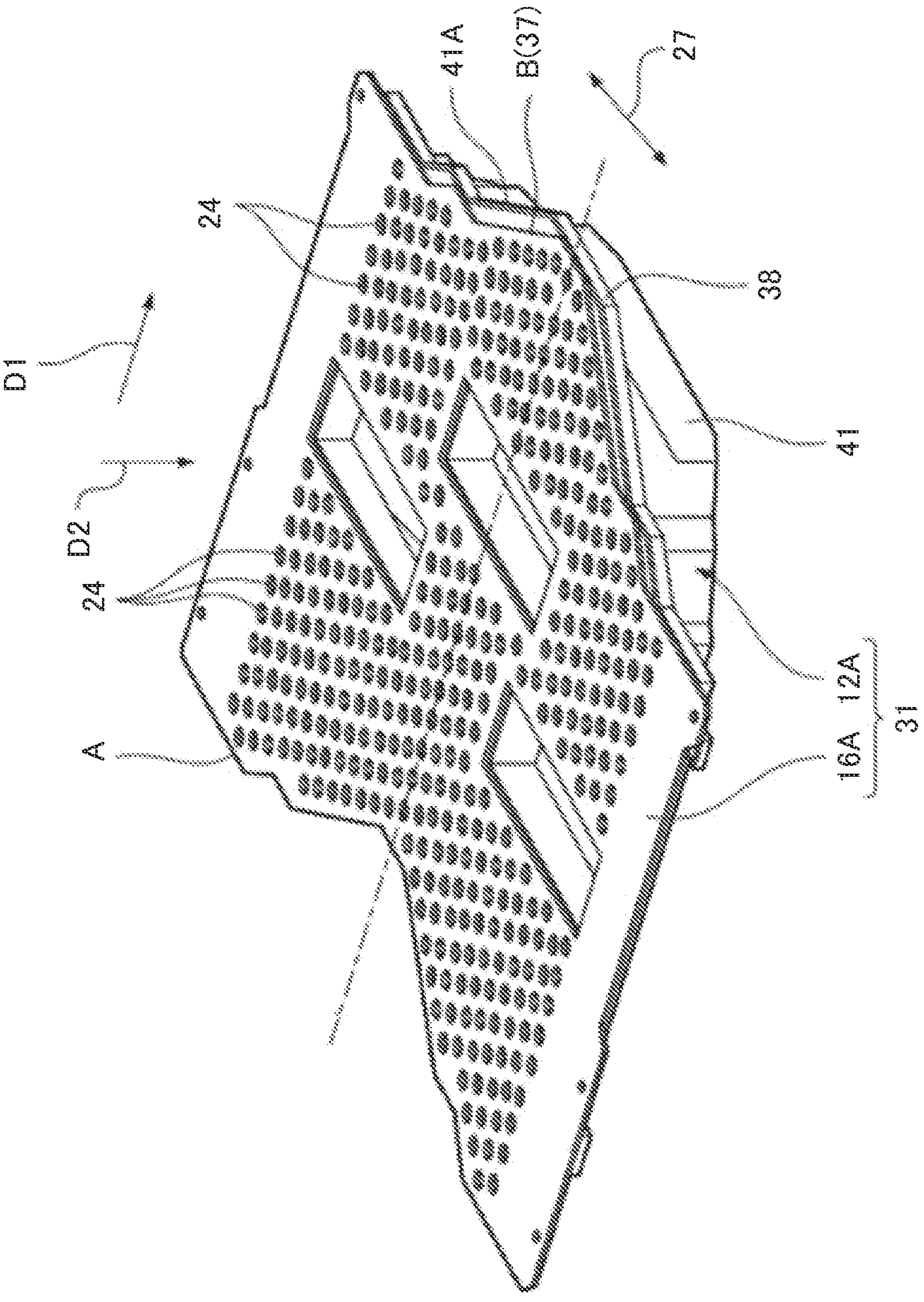
FIG. 6 is a perspective view showing a divided transport plate.
Figure 7:
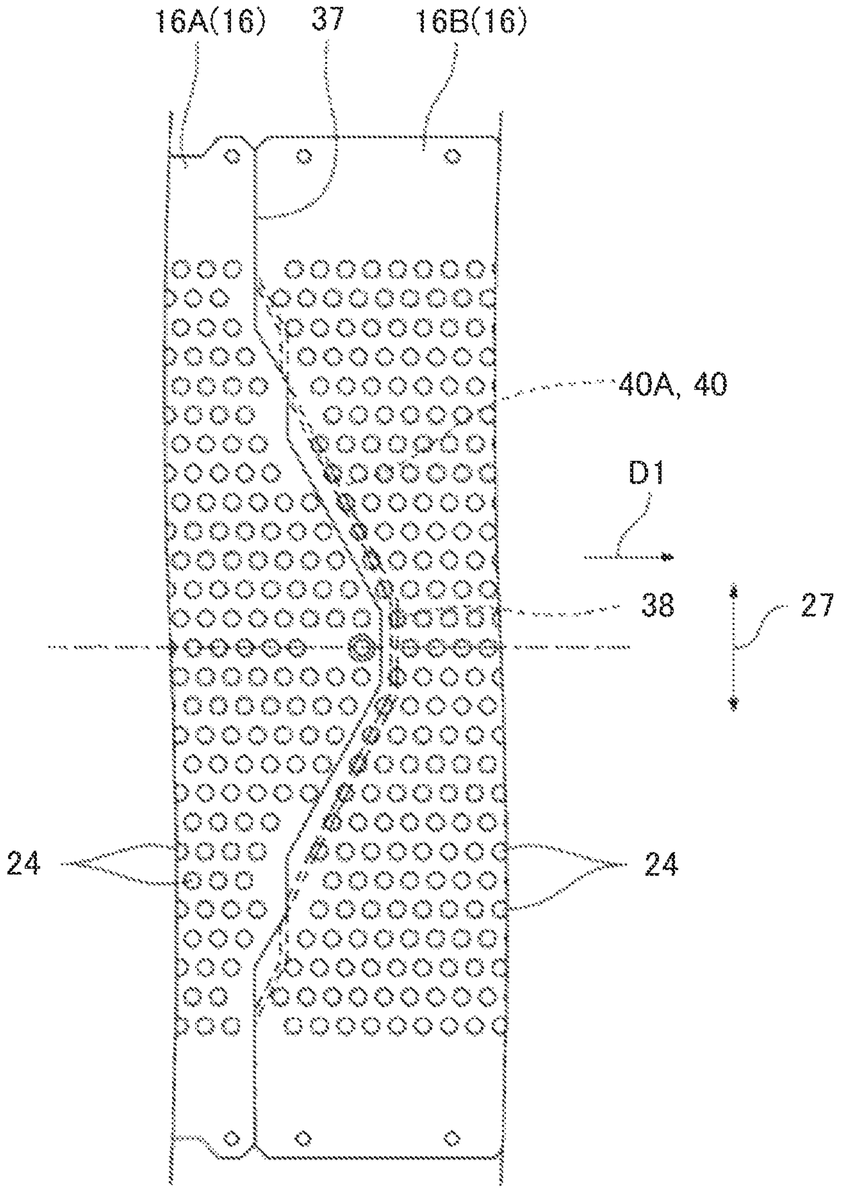
FIG. 7 is a partially enlarged plan view of the transport plate.

Referring to FIG. 1 to FIG. 7, an ink jet recording apparatus 1 according to the embodiment of the disclosure will be described. FIG. 1 is a schematic cross-sectional view showing a configuration of an ink jet recording apparatus 1. FIG. 2 is a perspective view showing a transport belt 15. FIG. 3 is a perspective view showing a transport plate 16. FIG. 4 is a cross-sectional view showing how units 31, 32, and 33 are connected. FIG. 5 is a cross-sectional view showing a first unit 31 and a second unit 32, separated from each other. FIG. 6 is a perspective view showing a divided transport plate 16A. FIG. 7 is a partially enlarged plan view of the transport plate 16. FIG. 7 illustrates a joint 37 between the divided transport plates 16A and 16B, and a joint 38 between suction chambers 12A and 12B.

As shown in FIG. 1, the ink jet recording apparatus 1 forms an image on the surface of a sheet 3 supplied from a sheet feeding device 2, and delivers the sheet 3 to a sheet delivery device 4. The sheet 3 exemplifies the recording medium in the disclosure. The sheet feeding device 2 includes a plurality of transport rollers for delivering the sheet 3 to the ink jet recording apparatus 1, and a resist roller for adjusting the timing to form the image on the sheet 3, to the timing to transport the sheet 3. The sheet delivery device 4 includes a plurality of delivery rollers for delivering the sheet 3 that has passed the ink jet recording apparatus 1.

The ink jet recording apparatus 1 includes a plurality of recording heads 10A, 10B, 10C, and 10D that each eject ink onto the sheet 3, a transport device 11 that transports the sheet 3 to respective image forming positions of the recording heads 10A, 10B, 10C, and 10D, and a suction device 12 that generates negative pressure, thereby adsorbing the sheet 3 to the transport device 11.

The transport device 11 includes a transport belt 15 that carries thereon the sheet 3, thereby transporting the same along a first direction D1, and a transport plate 16 supporting the transport belt 15, so as to slide along the first direction D1. The transport belt 15 exemplifies the endless belt in the disclosure.

The transport belt 15 is rotatably stretched around a plurality of rollers 19, 20, 21, and 22. One of the plurality of rollers 19, 20, 21, and 22 is driven so as to rotate, by a driver such as a motor.

As shown in FIG. 2, the transport belt 15 includes a plurality (multitude) of air intake holes 23, penetrating therethrough in a second direction D2. The suction device 12 is located on the opposite side of the sheet 3, across the transport belt 15. The transport plate 16 is located between the transport belt 15 and the suction device 12. As shown in FIG. 3, the transport plate 16 includes a plurality (multitude) of suction holes 24, penetrating therethrough from the side of the transport belt 15 (upper side) to the side of the suction device 12 (lower side). It is to be noted here that the direction in which the ink is ejected from the recording heads 10A, 10B, 10C, and 10D toward the sheet 3 corresponds to the second direction D2. The direction intersecting the second direction D2 is the first direction D1. In addition, the downstream side in the second direction D2 may be referred to as lower side, and the upstream side in the second direction D2 may be referred to as upper side.

As shown in FIG. 1, FIG. 3, and FIG. 4, the transport plate 16 includes a plurality of divided transport plates, namely a first divided transport plate 16A, a second divided transport plate 16B, a third divided transport plate 16C, and a fourth divided transport plate 16D, divided along the first direction D1 on the lower side of the transport belt 15. The suction device 12 includes a plurality of suction chambers, namely a first suction chamber 12A, a second suction chamber 12B, a third suction chamber 12C, and a fourth suction chamber 12D, divided along the first direction D1 on the lower side of the transport belt 15.

In the case of the existing ink jet recording apparatuses, when the size of the recording head is increased, or when the number of recording heads is increased, the endless belt is elongated, which leads to an increase in length of the transport plate and the suction device. Therefore, it becomes difficult to transport the transport plate and the suction device.

According to this embodiment, however, the transport plate 16 is divided into the plurality of divided transport plates 16A, 16B, 16C, and 16D, and the suction device 12 is divided into the plurality of suction chambers 12A, 12B, 12C, and 12D. Therefore, the transport plate 16 and the suction device 12 can be easily transported, despite the transport plate 16 and the suction device 12 being elongated. The divided transport plates 16A, 16B, 16C, and 16D are located on the upper side in the second direction D2, with respect to the suction chambers 12A, 12B, 12C, and 12D.

Here, the direction orthogonal to the first direction D1, and also to the second direction D2, will be defined as belt width direction 27. The belt width direction 27 corresponds to the third direction in the disclosure. As shown in FIG. 4 and FIG. 5, the suction chambers 12A, 12B, 12C, and 12D each include a pair of upright walls 40 and 41 opposed to each other in the first direction D1, a pair of sidewalls 42 opposed to each other in the belt width direction 27, a bottom wall 44, a suction fan 45 that generates negative pressure in the chamber, and a duct for discharging air introduced into the chamber by the suction fan 45.

The first divided transport plates 16A and the first suction chambers 12A constitute a first unit 31. The second divided transport plates 16B and the second suction chambers 12B constitute a second unit 32. The third divided transport plates 16C and the third suction chambers 12C constitute a third unit 33. The fourth divided transport plates 16D and the fourth suction chambers 12D constitute a fourth unit 34.

As shown in FIG. 1 and FIG. 4, the first unit 31, the second unit 32, the third unit 33, and the fourth unit 34 are connected to each other, with fastening members such as bolts and nuts. Thus, the transport plate 16 and the suction device 12 are formed.

As described above, the transport plate 16 and the suction device 12 are divided into the first unit 31, the second unit 32, the third unit 33, and the fourth unit 34. Therefore, the transport plate 16 and the suction device 12 can be easily transported, even though the transport plate 16 and the suction device 12 are elongated.

As shown in FIG. 5 and FIG. 6, the position of the first divided transport plate 16A is shifted from the position of the first suction chamber 12A in the first direction D1 of the transport belt 15, in the first unit 31. To be more specific, the position of one of the upright walls 40 of the first suction chamber 12A is shifted in the first direction D1, from an end portion A of the first divided transport plate 16A, and the position of the upper end portion of the other upright wall 41 is shifted in the first direction D1, from the other end portion B of the first divided transport plate 16A.

Likewise, in the second unit 32, the third unit 33, and the fourth unit 34 also, the positions of the second divided transport plate 16B, the third divided transport plate 16C, and the fourth divided transport plate 16D, are shifted from the positions of the second suction chamber 12B, the third suction chamber 12C, and the fourth suction chamber 12D, respectively, in the first direction D1 of the transport belt 15.

Accordingly, as shown in FIG. 4 and FIG. 7, the positions of joints 37 between the adjacent ones of the divided transport plates 16A, 16B, 16C, and 16D, are shifted in the first direction D1, from the positions of joints 38 between the adjacent ones of the suction chambers 12A, 12B, 12C, and 12D.

Therefore, one of the upright walls 40, and the upper end portion 41A of the other upright wall 41, which may otherwise disturb the flow of air introduced into the suction chambers 12A, 12B, 12C, and 12D through the suction holes 24 of the transport plate 16, are deviated from the position right under the joint 37 between the adjacent ones of the divided transport plates 16A, 16B, 16C, and 16D. Such a configuration ensures that the suction holes 24, located in the proximity of the joints 37 between the divided transport plates 16A, 16B, 16C, and 16D, properly communicate with the inner space of the suction chambers 12A, 12B, 12C, and 12D, thereby securing the necessary suction force at the joints 37 between the divided transport plates 16A, 16B, 16C, and 16D. As result, the sheet 3 can be surely adsorbed to the transport belt 15, even along the joints 37.

As shown in FIG. 7, the joints 37 between the adjacent ones of the divided transport plates 16A, 16B, 16C, and 16D are inclined with respect to the first direction D1, and also with respect to the belt width direction 27 (third direction). Therefore, the transport belt 15 can smoothly move in the first direction D1, in sliding contact with the divided transport plates 16A, 16B, 16C, and 16D. As result, the sheet 3 can also be smoothly transported.

Hereunder, the operation of the ink jet recording apparatus 1 will be described, with reference to FIG. 1, FIG. 2, and FIG. 3. The sheet 3 delivered from the sheet feeding device 2 to the transport belt 15 is transported in the first direction D1, by the transport belt 15 which is moving. While the sheet 3 is thus being transported, the ink is ejected from the recording heads 10A, 10B, 10C, and 10D, so that an image, such as characters or figures, is formed on the sheet 3. The sheet 3 having the image formed thereon is delivered from the transport belt 15 to the sheet delivery device 4.

By activating the suction fan 45 in each of the first unit 31, the second unit 32, the third unit 33, and the fourth unit 34, negative pressure is maintained in the suction chambers 12A, 12B, 12*c*, and 12D. Accordingly, air is introduced from the air intake holes 23 of the transport belt 15 and through the suction holes 24 of the divided transport plates 16A, 16B, 16C, and 16D, sucked into the suction chambers 12A, 12B, 12C, and 12D, and discharged to outside of the suction chambers 12A, 12B, 12C, and 12D, through the duct. Thus, the sheet 3 is kept adsorbed to the transport belt 15, while being transported in the first direction D1.

Although the suction fan 45 is employed to generate negative pressure in the suction chambers 12A, 12B, 12C, and 12D in the foregoing embodiment, for example a vacuum pump or the like may be employed, instead of the suction fan 45.

The embodiment of the disclosure has been described as above, with reference to the drawings. However, the disclosure is not limited to the foregoing embodiment, but may be modified in various manners, without departing from the scope of the disclosure. The drawings each schematically illustrate the elements for the sake of clarity, and the thickness, length, number of pieces, and interval of the illustrated elements may be different from the actual ones, because of the convenience in making up the drawings. Further, the material, shape, and size of the elements referred to in the foregoing embodiment are merely exemplary and not specifically limited, and may be modified as desired, without substantially departing from the configuration according to the disclosure.

INDUSTRIAL APPLICABILITY

The disclosure provides the ink jet recording apparatus, and is therefore industrially applicable.

While the present disclosure has been described in detail with reference to the embodiments thereof, it would be apparent to those skilled in the art the various changes and modifications may be made therein within the scope defined by the appended claims.

What is claimed is:

1. An ink jet recording apparatus comprising:

a recording head that ejects ink onto a recording medium;

a transport device including an endless belt that transports the recording medium along a first direction, toward an image forming position of the recording head, and a transport plate slidably supporting the endless belt; and a suction device located on an opposite side of the recording medium across the endless belt, and configured to adsorb the recording medium to the endless belt, wherein the endless belt includes a plurality of air intake holes, penetrating through the endless belt in a second direction, intersecting the first direction and corresponding to a direction in which the ink is ejected from the recording head toward the recording medium, the transport plate is located between the endless belt and the suction device and is divided into a plurality of divided transport plates, which are aligned in the first direction and connected to each other by a first joint, and each of the divided transport plates has a plurality of suction holes penetrating in the second direction, the suction device includes a plurality of suction chambers, which are arranged along the first direction and are connected to each other by a second joint, and the first joint and the second joint are positionally shifted from each other in the first direction.

2. The ink jet recording apparatus according to claim 1, wherein the suction device includes, in each of the plurality of suction chambers, a suction fan that generates negative pressure in the suction chamber.

3. An ink jet recording apparatus comprising:

a recording head that ejects ink onto a recording medium;

a transport device including an endless belt that transports the recording medium along a first direction, toward an image forming position of the recording head, and a transport plate slidably supporting the endless belt; and a suction device located on an opposite side of the recording medium across the endless belt, and configured to adsorb the recording medium to the endless belt, wherein the endless belt includes a plurality of air intake holes, penetrating through the endless belt in a second direction, intersecting the first direction and corresponding to a direction in which the ink is ejected from the recording head toward the recording medium, the transport plate is located between the endless belt and the suction device and is divided into a plurality of divided transport plates, which are aligned in the first direction and connected to each other by a first joint, and each of the divided transport plates has a plurality of suction holes penetrating in the second direction, the suction device includes a plurality of suction chambers, which are arranged along the first direction and are connected to each other by a second joint, and the first joint and the second joint are positionally shifted from each other in the first direction, wherein the divided transport plates are located above the suction chambers, one of the divided transport plates and a corresponding one of the suction chambers constitute one unit, the transport plate and the suction device are formed by connecting a plurality of units, and a position of a divided transport plate is shifted in the first direction from a position of a suction chamber, in each of the units.

4. An ink jet recording apparatus comprising:

a recording head that ejects ink onto a recording medium;

a transport device including an endless belt that transports the recording medium along a first direction, toward an image forming position of the recording head, and a transport plate slidably supporting the endless belt; and a suction device located on an opposite side of the recording medium across the endless belt, and configured to adsorb the recording medium to the endless belt, wherein the endless belt includes a plurality of air intake holes, penetrating through the endless belt in a second direction, intersecting the first direction and corresponding to a direction in which the ink is ejected from the recording head toward the recording medium, the transport plate is located between the endless belt and the suction device and is divided into a plurality of divided transport plates, which are aligned in the first direction and connected to each other by a first joint, and each of the divided transport plates has a plurality of suction holes penetrating in the second direction, the suction device includes a plurality of suction chambers, which are arranged along the first direction and are connected to each other by a second joint, and the first joint and the second joint are positionally shifted from each other in the first direction, wherein the first joint is inclined with respect to the first direction, and also to a third direction orthogonal to the first direction and the second direction.

* * * * *